(No Model.)
A. W. SEVERANCE.
COMBINATION TOOL.
No. 585,123.  Patented June 22, 1897.
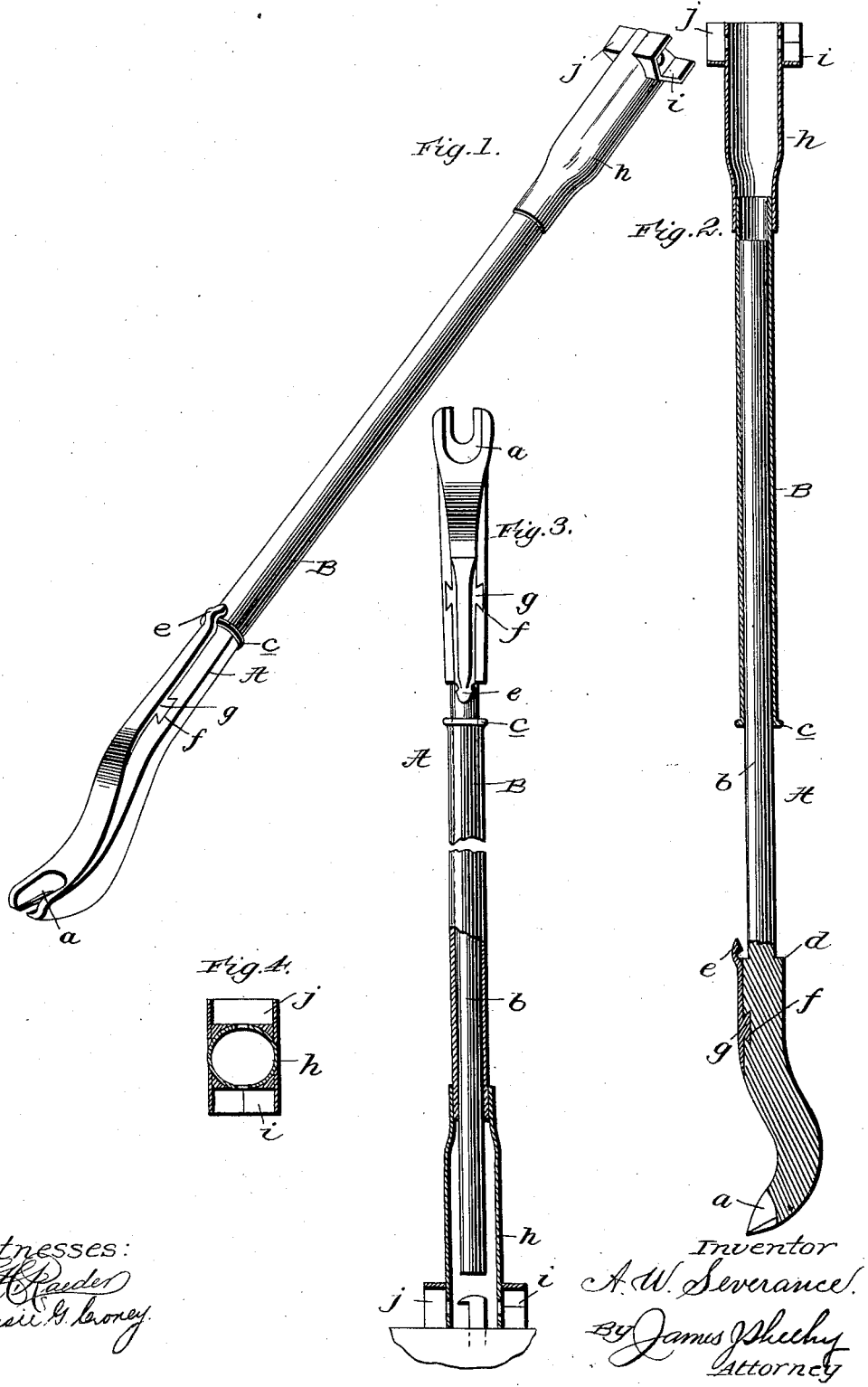

UNITED STATES PATENT OFFICE.

ADAM W. SEVERANCE, OF GENESEE, IDAHO.

COMBINATION-TOOL.

SPECIFICATION forming part of Letters Patent No. 585,123, dated June 22, 1897.

Application filed March 9, 1897. Serial No. 626,626. (No model.)

*To all whom it may concern:*

Be it known that I, ADAM W. SEVERANCE, a citizen of the United States, residing at Genesee, in the county of Latah and State of Idaho, have invented certain new and useful Improvements in Combination-Tools; and I do declare the following to be a full, clear, and exact description of the invention, such as will enable others skilled in the art to which it appertains to make and use the same.

This invention relates to a combination-tool designed more particularly for track-walkers; and it has for its object to produce at a comparatively small expense a combined implement which may be used as a claw-hammer, a wrench for various kinds of nuts, for driving spikes, and for various other purposes.

Other objects and advantages will appear from the following description and claims when taken in connection with the annexed drawings, in which—

Figure 1 is a perspective view. Fig. 2 is a vertical longitudinal sectional view showing the tubular portion extended on the shank of the claw-bar, so as to obtain an increased leverage. Fig. 3 is a view, partly in elevation and partly in section, of the improved tool, showing the same in a position ready to drive a spike; and Fig. 4 is a cross-sectional view taken through the lower portion of the tube and at the wrench-seat thereof.

Referring by letter to the said drawings, A indicates a claw-bar, which may be mainly of the ordinary construction, having the bifurcated lower end $a$ to receive a spike or the like, and its shank or stem $b$ is rounded, so as to receive a removable tube B.

The tube B is preferably provided with the annular external shoulder $c$ at its inner end, and the shank $b$ of the claw-bar is also preferably shouldered at the point $d$ to form an abutment for the tube, and the shank is also provided at the shoulder portion with a catch $e$. This catch in the present illustration is shown as composed of a spring strip of metal, which may be steel, having the hooked portion, as shown, and the bar is grooved transversely, as shown at $f$, and the spring strip has a dovetailed lug $g$ to enter the groove $f$, which is of a corresponding shape.

I do not wish to limit myself to the form and construction of spring used for holding the tube upon the shank or stem of the bar, and while the means described are preferable for the purpose, as the same will securely hold the tube from displacement and yet allow the said tube to turn, I am aware that other means might be employed for the purpose.

The tube B, which is of the diameter to receive the shank of the bar, is enlarged at its outer end, as shown at $h$, so as to permit the introduction of the railroad-spike, as better shown in Fig. 3 of the drawings. This enlarged portion may be composed of a separate piece of metal suitably united to the tube B or it may be formed integral with said tube. The tube is of less length than the shank or stem of the bar, so that the latter may pass entirely through the tube, and the said tube is provided at its outer end with laterally-disposed wrenches. The wrench $i$ is of a shape to receive the hexagonal nut, while the wrench $j$ on the opposite side of the tube is of a shape to receive the square or rectangular nut. These wrenches can of course be shaped to suit the fancy or dictation of the mechanic, and I have shown them arranged one on each side of the tube at its outer end.

With a device of this character when it is desirable to drive a spike the bar should be unfastened from the tube by releasing the spring-catch and then raising to a sufficient altitude. By then placing the spike within the free or enlarged end of the tube and placing the latter at the point desired to be driven by using the bar as a ram the spike may be driven home. When the bar is connected with the tube by the catch, the implement can be used as a claw-bar, and by disconnecting the two an increase of leverage can be obtained to the extent of the movement of the tube upon the bar.

The wrenches can be used while the tube is connected with the bar; but when it is desirable to lighten the weight in using the wrenches, or either of them, the spring-catch can be manipulated so as to remove the tube from the bar.

Having thus described my invention, what I claim is—

1. The combination-tool comprising the bar having the claw at one end and the tube receiving the shank or stem of the bar and adapted to be detachably secured thereto and having one or more wrenches at its outer end, substantially as specified.

2. The combination-tool comprising a bar having a claw at one end and a tube adapted to receive the spike at one end, and also receive the shank or stem of the bar, said shank being of a greater length than the tube and having a catch to engage the tube, substantially as specified.

3. The combination-tool comprising the bar having a claw at one end and its shank or stem rounded, and also having a spring-catch, and the tube having an annular shoulder or flange to be engaged by the catch, and also having its outer or opposite end enlarged to receive a spike, and provided with one or more laterally-disposed wrenches, substantially as specified.

In testimony whereof I affix my signature in presence of two witnesses.

ADAM W. SEVERANCE.

Witnesses:
C. B. OLIVER,
F. H. SHIPTON.